(12) United States Patent
Tanuma et al.

(10) Patent No.: US 8,837,912 B2
(45) Date of Patent: Sep. 16, 2014

(54) INFORMATION PROCESSING APPARATUS, INFORMATION PROCESSING METHOD AND PROGRAM

(71) Applicants: Sony Corporation, Tokyo (JP); Sony Computer Entertainment Inc., Tokyo (JP)

(72) Inventors: Fumihiko Tanuma, Tokyo (JP); Shinichirou Tobinaga, Tokyo (JP)

(73) Assignees: Sony Corporation (JP); Sony Computer Entertainment Inc. (JP)

( * ) Notice: Subject to any disclaimer, the term of this patent is extended or adjusted under 35 U.S.C. 154(b) by 0 days.

(21) Appl. No.: 13/718,188

(22) Filed: Dec. 18, 2012

(65) Prior Publication Data

US 2013/0163949 A1  Jun. 27, 2013

(30) Foreign Application Priority Data

Dec. 27, 2011  (JP) .................................. 2011-284749

(51) Int. Cl.
*G11B 27/00* (2006.01)
*H04N 5/93* (2006.01)

(52) U.S. Cl.
USPC ............ 386/278; 386/280; 386/286; 386/282

(58) Field of Classification Search
USPC .................................. 386/278, 280, 286, 282
See application file for complete search history.

(56) References Cited

U.S. PATENT DOCUMENTS

| | | | |
|---|---|---|---|
| 7,623,756 B2* | 11/2009 | Komori et al. ................. | 386/343 |
| 8,116,608 B2* | 2/2012 | Yamashita et al. ............ | 386/201 |
| 2010/0278509 A1* | 11/2010 | Nagano et al. ................ | 386/230 |
| 2011/0211802 A1* | 9/2011 | Kamada et al. ............... | 386/201 |

FOREIGN PATENT DOCUMENTS

JP  2009-141895 A  6/2009

* cited by examiner

*Primary Examiner* — Daquan Zhao
(74) *Attorney, Agent, or Firm* — Lerner, David, Littenberg, Krumholz & Mentlik, LLP

(57) ABSTRACT

There is provided an information processing apparatus including a control unit controlling playback of an image of an edit target, and a generation unit generating edit information including information indicating multiple edit effects applied in combination with the image of an edit interval and information indicating the edit interval, where, in a playback interval of the image, the edit interval is an interval from a playback position at a time an instruction is given during the playback of the image to a position a predetermined time after the playback position.

12 Claims, 16 Drawing Sheets

ND PROGRAM

CROSS-REFERENCE TO RELATED APPLICATION

The present application claims priority from Japanese Patent Application No. JP 2011-284749 filed in the Japanese Patent Office on Dec. 27, 2011, the entire content of which is incorporated herein by reference.

BACKGROUND

The present disclosure relates to an information processing apparatus, an information processing method and a program. To be more specific, the present disclosure relates to an information processing apparatus, an information processing method and a program that can set a plurality of edit effects more simply.

Along with the popularization of a so-called smart phone, more people take motion pictures using a mobile terminal with a camera function.

It is also becoming popular to import motion pictures taken by a mobile terminal into a device such as a personal computer in which software for motion picture edit is installed, and edit the motion pictures by performing cut edit or attaching various edit effects (i.e. effects) (see, for example, JP 2009-141895A).

SUMMARY

An operation flow of attaching an edit effect is that, normally, an edit effect type is selected from edit effect types prepared in advance, and an interval to which the selected edit effect is attached is searched for and designated while looking at motion pictures of an edit target.

In the case of using a combination of multiple edit effects, it is requested to repeat selection of an edit effect type and designation of an interval to which the edit effect is attached, and therefore the operation takes a lot of troubles.

Also, even if a synergetic effect is exerted by using a combination of multiple edit effects to enable a more effective production, especially a beginner in edit has difficulty in finding such a thing. As a result, even if there are enough edit effect types, they often fail to be sufficiently used.

The present disclosure is made in view of such a state, and it is desirable to be able to set a plurality of edit effects more simply.

According to an embodiment of the present disclosure, there is provided an information processing apparatus which includes: a control unit controlling playback of an image of an edit target; and a generation unit generating edit information including information indicating multiple edit effects applied in combination with the image of an edit interval and information indicating the edit interval, where, in a playback interval of the image, the edit interval is an interval from a playback position at a time an instruction is given during the playback of the image to a position a predetermined time after the playback position.

The control unit can combine and apply the multiple edit effects to the image of the edit interval based on the edit information in the case of playing the image for which the edit information is generated.

It is possible to further provide a display control unit displaying a selection screen for the predetermined time and a type of the edit effect before a start of the playback of the image.

In a case where one of the edit effects is selected as the edit effect applied to the image of the edit interval, the generation unit can generate the edit information including information indicating the one edit effect and information indicating the edit interval.

The display control unit can display a timeline in which an icon indicating an interval applying the edit effect is arranged in a start position of the edit interval.

The display control unit can display different icons as an icon indicating an interval to which the multiple edit effects are applied and an icon indicating an interval to which the one edit effect is applied.

The display control unit can display an interval of the timeline corresponding to the edit interval to which the multiple edit effects are applied, and an interval of the timeline corresponding to the edit interval to which the one edit effect is applied, in different colors.

It is possible to further provide a management unit recording and managing the edit information separately from the image.

The management unit can delete information of the edit effect selected by a user, from the edit information.

The management unit can change content of the edit effect selected by a user and record information of the edit effect representing the changed content, in the edit information.

Another embodiment of the present disclosure includes: playing an image of an edit target; and generating edit information including information indicating multiple edit effects applied in combination with the image of an edit interval and information indicating the edit interval, where, in a playback interval of the image, the edit interval is an interval from a playback position at a time an instruction is given during the playback of the image to a position a predetermined time after the playback position.

According to an embodiment of the present disclosure, it is possible to set a plurality of edit effects more simply.

DETAILED DESCRIPTION OF THE EMBODIMENT(S)

Figure 1:
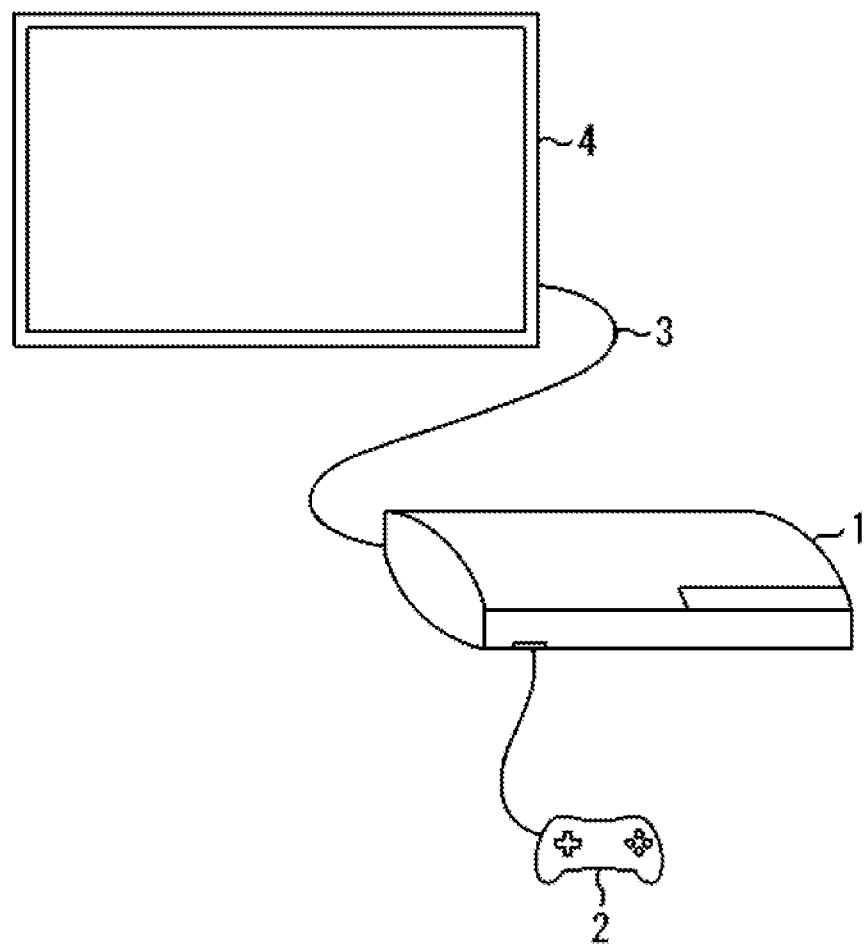
FIG. 1 is a view illustrating an outline of an information processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Outline of Information Processing Apparatus

FIG. 1 is a view illustrating an outline of an information processing apparatus according to an embodiment of the present disclosure.

A controller 2 including various buttons such as a cross button is connected to an information processing apparatus 1. The user operates the information processing apparatus 1 using the controller 2.

A display apparatus 4 including a display such as an LCD (Liquid Crystal Display) is connected to the information processing apparatus 1 via a cable 3 such as an HDMI (High Definition Multimedia Interface) cable. Based on data output from the information processing apparatus 1, various screens are displayed on the display of the display apparatus 4.

The information processing apparatus 1 includes image edit software which is software to edit an image taken using a mobile terminal such as a digital camera and a mobile telephone device with a camera function. An image is imported from the mobile terminal to the information processing apparatus 1 via a storage medium such as a memory card and a USB (Universal Serial Bus) memory or via wired or wireless communication performed between the information processing apparatus 1 and the mobile terminal.

The information processing apparatus 1 performs an edit with respect to images such as motion pictures and contents that include multiple still pictures and play the still pictures in a slideshow format.

An image edit by the information processing apparatus 1 is performed by generating edit data including information of an action tag indicating edit effect content, in response to user's selection, and managing it in association with image data without processing the image data itself. For example, edit data is generated every edit target image, and one edit data records information of an action tag which is selected by the user and uniquely set to a target image. As described below, the action tag information includes information indicating content of an edit effect selected by the user and information indicating an edit interval corresponding to an interval to which the edit effect is applied.

At the time of playback of an edited image, edit data is read out and the image is played while applying in real time an edit effect indicated by the action tag information included in the edit data.

Display Example of Edit Screen

[Edit Menu]

Figure 2:
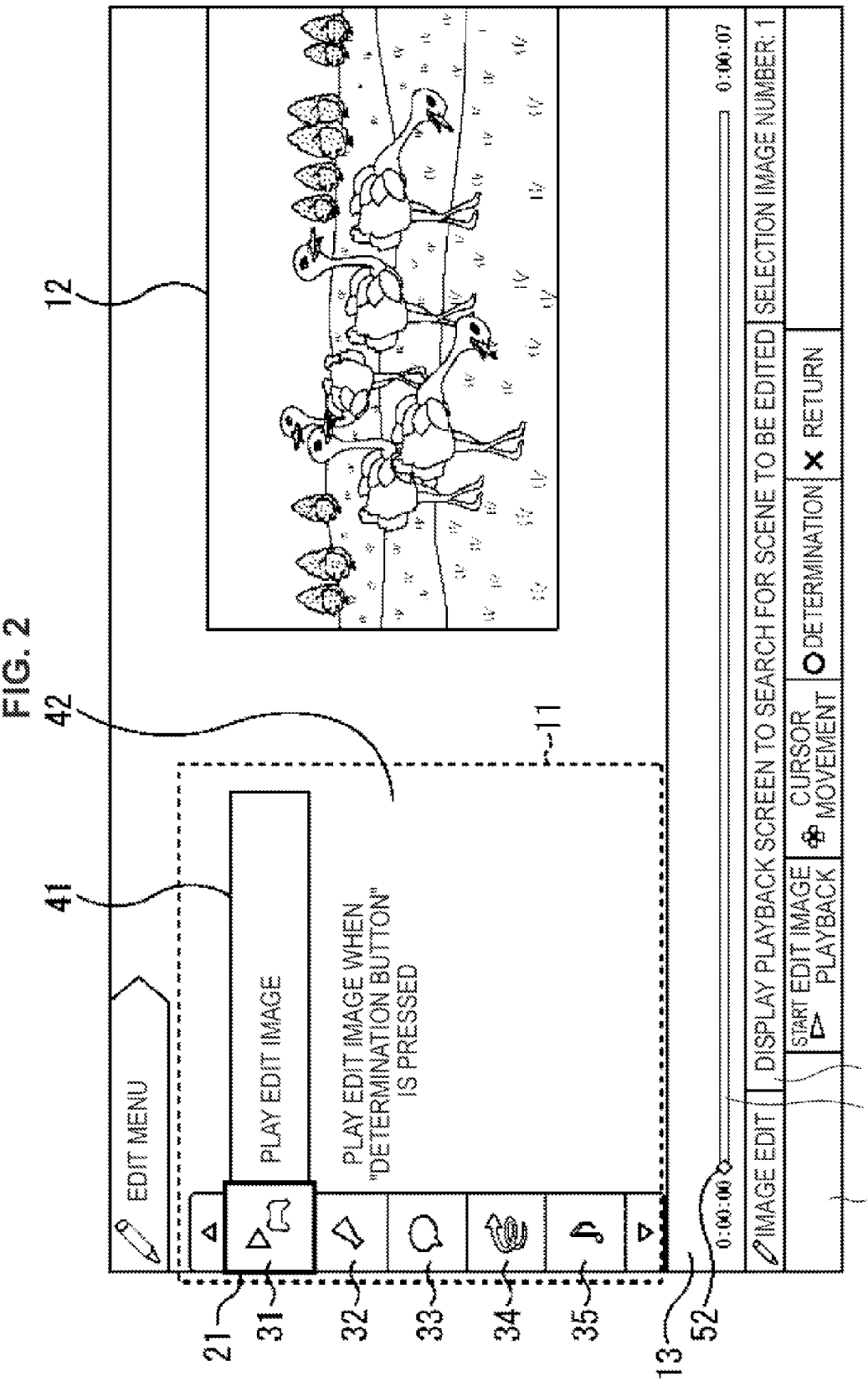
FIG. 2 is a view illustrating an example of an edit screen.

FIG. 2 is a view illustrating an example of an edit screen displayed on the display of the display apparatus 4 by image edit software. The edit screen in FIG. 2 is displayed, for example, when image edit software is started up and an edit target image is selected.

An edit menu 11 is displayed on the left side of the edit screen. The edit menu 11 includes icons 31 to 35 arranged in a vertical direction, an area 41 and an area 42.

The icon 31 indicates playback of the edit target image and the icon 32 indicates a record of a multi-action tag. The icon 33 indicates a record of a caption action tag and the icon 34 indicates a record of special playback action tag. The icon 35 indicates a record of a sound effect action tag. From the edit menu 11 in FIG. 2, it is also possible to select an action tag edit.

The multi-action tag denotes an action tag to designate a combination of multiple edit effects. The caption action tag denotes an action tag to designate insertion of a caption in the edit target image. The special playback action tag denotes an action tag to designate special playback of the edit target image such as repeat playback and slow playback. The sound effect action tag denotes an action tag to designate a sound effect to be output in association with a display of the edit target image.

In the example of FIG. 2, the icon 31 selected by a cursor 21 is displayed in a slightly larger size than other icons. A functional name is displayed on the area 41 on the right side of the icon 31 and an operational explanation is displayed on the area 42 below the area 41. When a determination button of the controller 2 is pressed in a state where the icon 31 is selected, playback of the edit target image is started.

On the right side of the edit menu 11, an image display area 12 which is a display area of the edit target image is formed. When playback of the edit target image is started, the image display area 12 displays each frame forming the edit target image.

Below the edit screen, a timeline area 13, which is a display area of timeline indicating playback interval of the edit target image, is formed. The timeline includes a bar 51 and a pointer 52 indicating the current playback position.

In the example of FIG. 2, playback of the edit target image is not started, and therefore the pointer 52 indicates the head position of the edit target image. "0:00:00" indicating the playback position is displayed on the left side of the timeline and "0:00:07" indicating the end time (i.e. playback time of the edit target image) with reference to "0:00:00" of the head time is displayed on the right side.

A message area 14 below the timeline area 13 displays various messages related to operations.

A button explanation area 15 displays information related to operations assigned to the buttons of the controller 2. In the example of FIG. 2, operations of edit image playback, cursor movement, determination and return are assigned to predetermined buttons of the controller 2.

The edit image playback denotes an operation used when starting playback of the edit target image.

The cursor movement denotes an operation used when switching an item selected by the cursor 21. For example, the cross button of the controller 2 is assigned to the cursor movement. When the up button of the cross button is pressed once in the edit screen of FIG. 2, all the icons forming the edit menu 11 shift downward and the state of the edit menu 11 becomes a state in which an icon immediately above the icon that was previously selected is selected by the cursor 21. Meanwhile, when the down button is pressed once, all the icons forming the edit menu 11 shift upward and the state of the edit menu 11 becomes a state in which an icon immediately below the icon that was previously selected is selected by the cursor 21.

Figure 3:
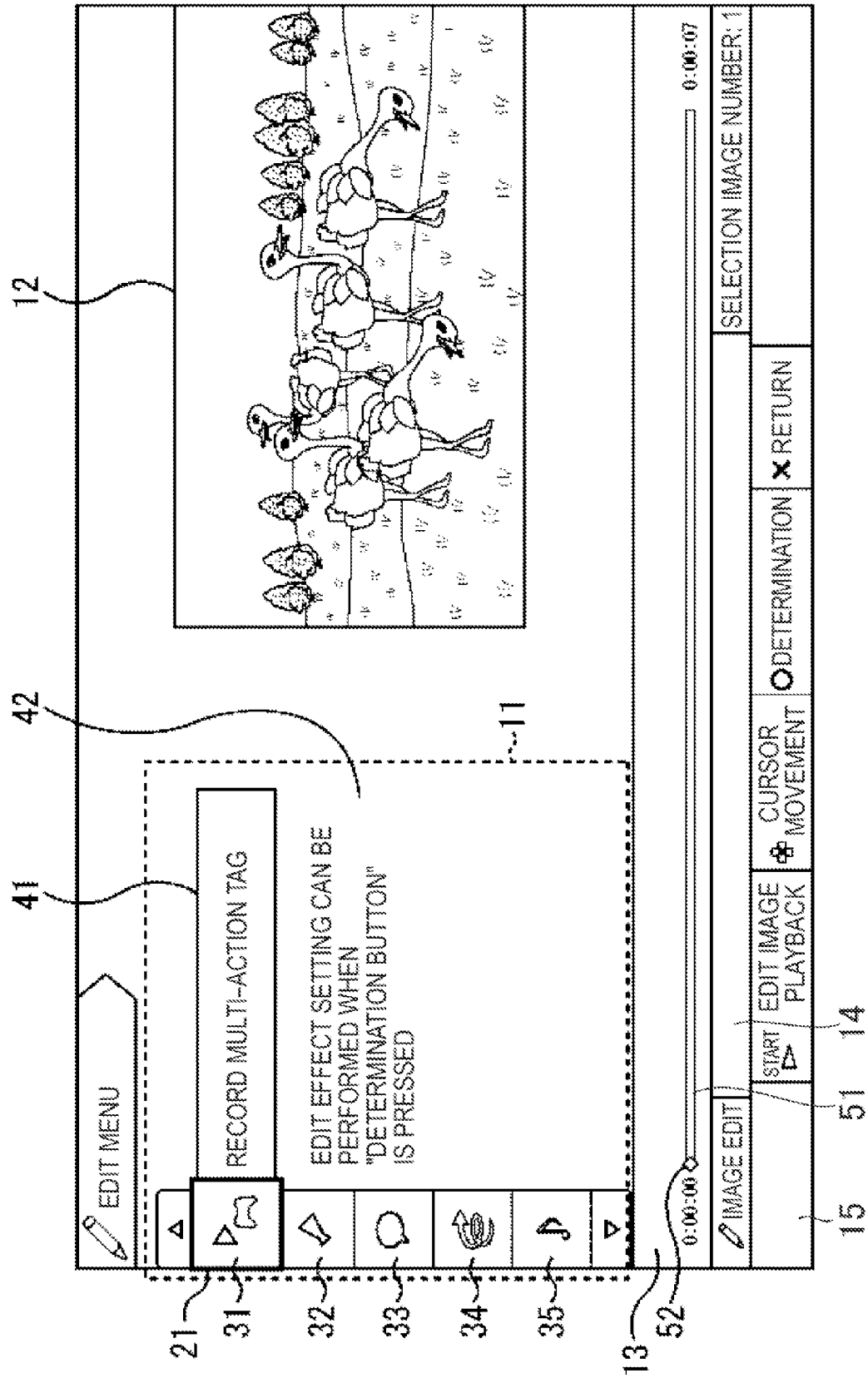
FIG. 3 is a view illustrating an example of an edit screen.

FIG. 3 is a view illustrating an example of the edit screen in a case where the down button of the controller 2 is pressed once in the state of FIG. 2. In the edit screen of FIG. 3, the icon 32 indicating a record of the multi-action tag is selected by the cursor 21. In response to the selection of the icon 32, the display in the area 41 and the area 42 is switched. An icon 36 displayed below the icon 35 in FIG. 3 denotes an icon indicating an edit of action tags.

The determination denotes an operation used when determining an item selected by the cursor 21. The return denotes an operation used when returning to the previous screen display.

From the edit menu 11, the user can select one of the edit target image playback, the multi-action tag record, the caption action tag record, the special playback action tag record, the sound effect action tag record and the action tag edit.

[Record of Multi-Action Tag]

Figure 4:
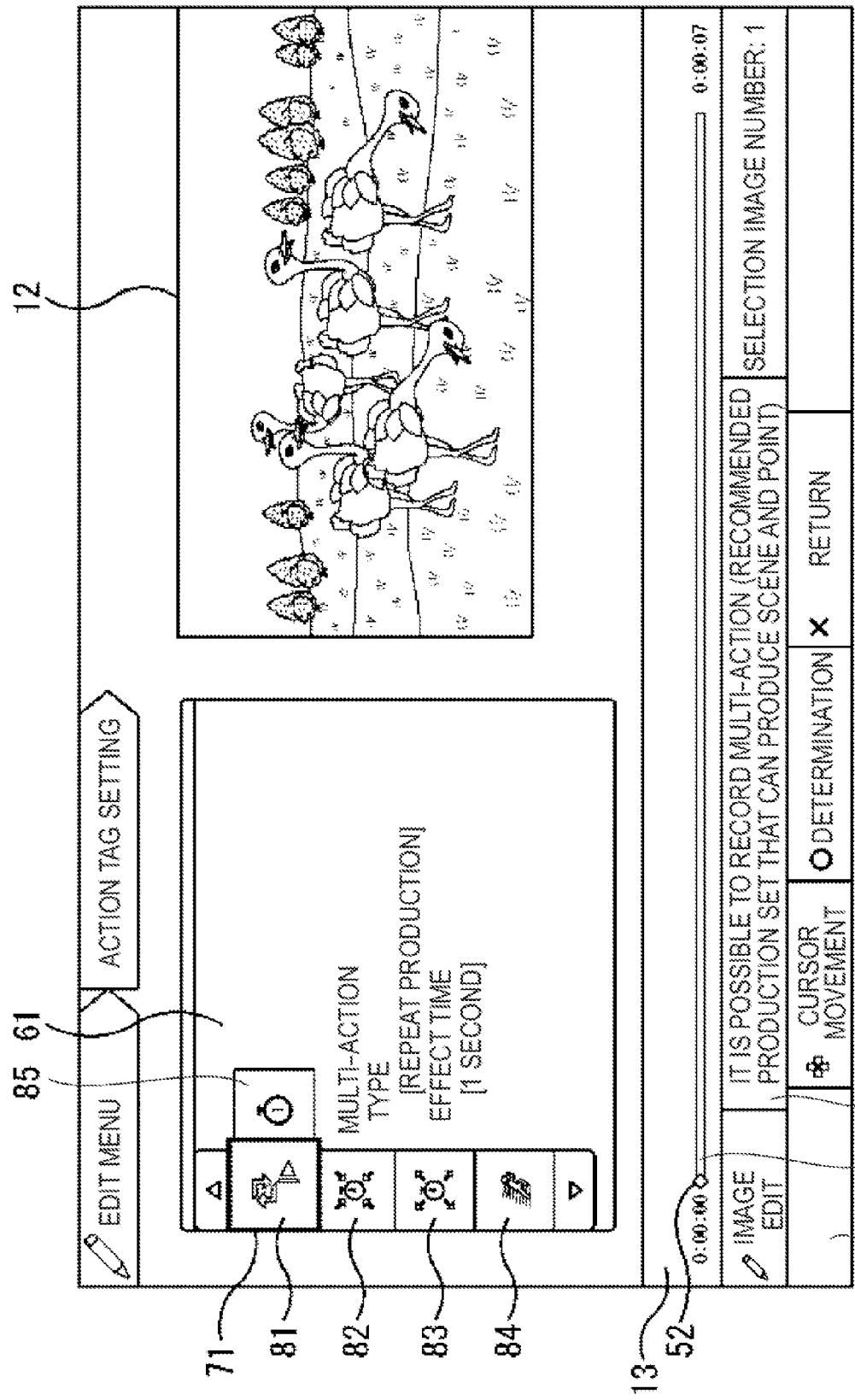
FIG. 4 is a view illustrating an example of an edit screen.

FIG. 4 is a view illustrating an example of an edit screen displayed when the determination button is pressed in the state of FIG. 3. Explanation overlapped with the explanation of FIG. 2 and FIG. 3 will be adequately omitted.

In the position in which the edit menu 11 (in FIG. 2 and FIG. 3) is displayed, a setting menu 61 of action tags is displayed. The setting menu 61 displays icons 81 to 84 arranged in the vertical direction.

The icon 81 denotes a repeat production. The repeat production denotes a production to repeatedly play a target interval twice. The first playback is performed at normal speed and the second playback is performed at slower speed than the normal speed (i.e. slow playback is performed). Also, before the second playback starts after the first playback is finished, a sound effect similar to sound of rewinding a videotape is output. That is, the repeat production denotes a production to combine and apply two edit effects of the repeat playback edit effect, which performs the first playback at normal speed and the second playback at slow speed, and the edit effect to attach a sound effect before the start of the second playback.

The icon 82 indicates a slow production (approach). The slow production (approach) denotes a production to perform a zoom-in display with respect to the frame center while playing a target interval at slow speed. The slow production (approach) denotes a production to combine and apply two edit effects of the slow playback edit effect and the zoom-in edit effect.

The icon 83 indicates a slow production (away). The slow production (away) denotes a production to perform a zoom-out display with respect to the frame center while playing a target interval at slow speed. The slow production (away) denotes a production to combine and apply two edit effects of the slow playback edit effect and the zoom-out edit effect.

The icon 84 indicates an accelerating production. The accelerating operation denotes a production to play a target interval at fast speed and output a sound effect indicating the acceleration during the fast-forward playback. The accelerating production denotes an operation to combine and apply two edit effects of the fast-forward playback edit effect and the sound effect output edit effect.

In addition to the repeat production, the slow production (approach), the slow production (away) and the accelerating product, it is also possible to select a silent product from the setting menu 61. The silent production denotes a production to play a target interval at slow speed and mute audio during the slow playback. The silent production denotes a production to combine and apply two edit effects of the slow playback edit effect and the silent edit effect.

In the example of FIG. 4, the repeat production is selected by the cursor 71 and the icon 81 is displayed in a slightly larger size than other icons. The right side of the icon 81 displays an icon 85 indicating the length of an interval to which the repeat production is applied.

The icon 85 including a digit of "1" indicates that an effect time corresponding to a time period during which an edit effect is applied is 1 second. By pressing the right button of the controller 2 once to move the cursor 71 and get in a state in which the icon 85 is selected, and subsequently pressing the up button or the down button in that state, the user can select an effect time of the repeat production.

Figure 5:
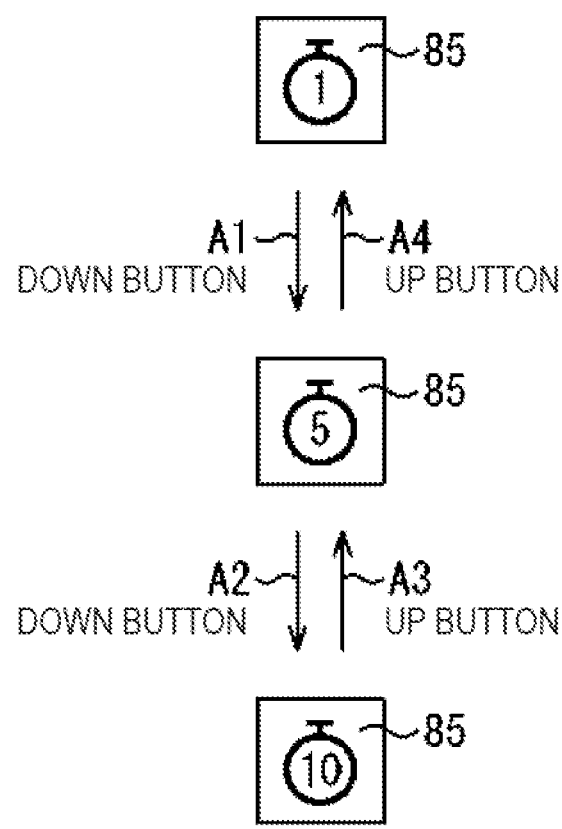
FIG. 5 is a view illustrating an example of icon switching.

FIG. 5 is a view illustrating an example of switching the display of the icon 85. When pressing the down button once in a state where the icon 85 including a digit of "1" is displayed, as illustrated in the top of arrow A1, the icon 85 is switched to an icon including a digit of "5." The icon 85 including a digit of "5" indicates that the effect time is 5 seconds.

Also, when pressing the down button once in a state where the icon 85 including a digit of "5" is displayed, as illustrated in the top of arrow A2, the icon 85 is switched to an icon including a digit of "10." The icon 85 including a digit of "10" indicates that an effect time is 10 seconds.

When pressing the up button once in a state where the icon 85 indicating that an effect time is 10 seconds is displayed, as illustrated in the top of arrow A3, the icon 85 is returned to the icon indicating that the effect time is 5 seconds. When pressing the up button once in a state where the icon 85 indicating that an effect time is 5 seconds is displayed, as illustrated in the top of arrow A4, the icon 85 is returned to the icon indicating that the effect time is 1 second.

Returning to the explanation of FIG. 4, below the icon 85, there is displayed an explanation that the currently selected action tag is a multi-action tag in which the edit effect type is the repeat production and the effect time is 1 second.

The button explanation area 15 displays information indicating that operations of the cursor movement, determination and return are assigned to predetermined buttons of the controller 2. When a determination button as the button assigned to the determination is pressed once, content displayed on the setting menu 61 is determined and playback of the edit target image is started.

Figure 6:
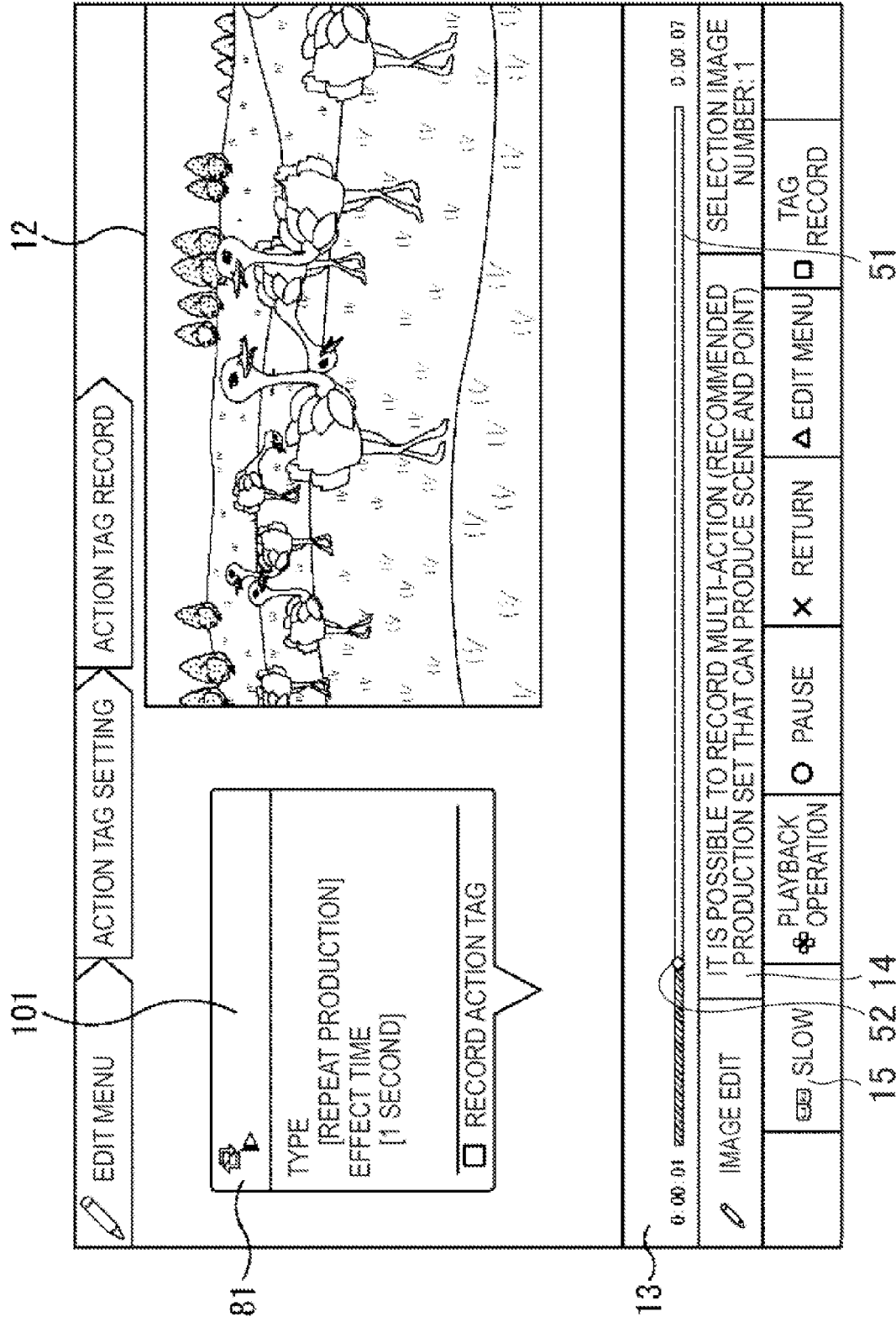
FIG. 6 is a view illustrating an example of an edit screen.

FIG. 6 is a view illustrating an example of an edit screen when the determination button is pressed in the state of FIG. 4.

A timeline area 13 of the edit screen in FIG. 6 displays a timeline indicating that the current playback position is the position at 1 second from the beginning. "0:00:01" is displayed on the left side of the timeline and, in the bar 51 forming the timeline, a played interval and a non-played interval are displayed by different colors. The edit screen in FIG. 6 indicates a display at 1 second after the start of the playback of the edit target image.

When the playback of the edit target image is started, the state of the edit screen becomes a state in which a record position of the multi-action tag of the content selected using the setting menu 61 is designated. In the information processing apparatus 1, edit effect content is selected before the start of the playback of the edit target image, and an interval to which the edit effect is applied is designated during the playback of the edit target image.

The edit screen in FIG. 6 displays a balloon 101 in the position on which the setting menu 61 (in FIG. 4) was previously displayed. In the balloon 101, the content of the multi-action tag selected in the setting menu 61 is displayed together with the icon 81, and, below it, there is displayed an explanation that an operation of recording an action tag is assigned to a predetermined button.

The button explanation area 15 displays information indicating that operations of a frame back/advance, playback operation, pause, return, edit menu and tag record are assigned to predetermined buttons of the controller 2.

The frame back/advance denotes an operation used when switching a playback of the edit target image to a frame back playback or frame advance playback. The playback operation denotes an operation used when shifting a playback position. The pause denotes an operation used when stopping the playback of the edit target image. The return denotes an operation used when returning to the previous screen display. The edit menu denotes an operation used when returning to the edit screen of FIG. 3 on which the edit menu 11 is displayed.

The tag record denotes an operation used when recording an action tag in the current playback position. In the example case of FIG. 6, when a tag record button corresponding to a button assigned to the tag record operation is pressed once, the multi-action tag is recorded in the playback position at that time.

Figure 7:
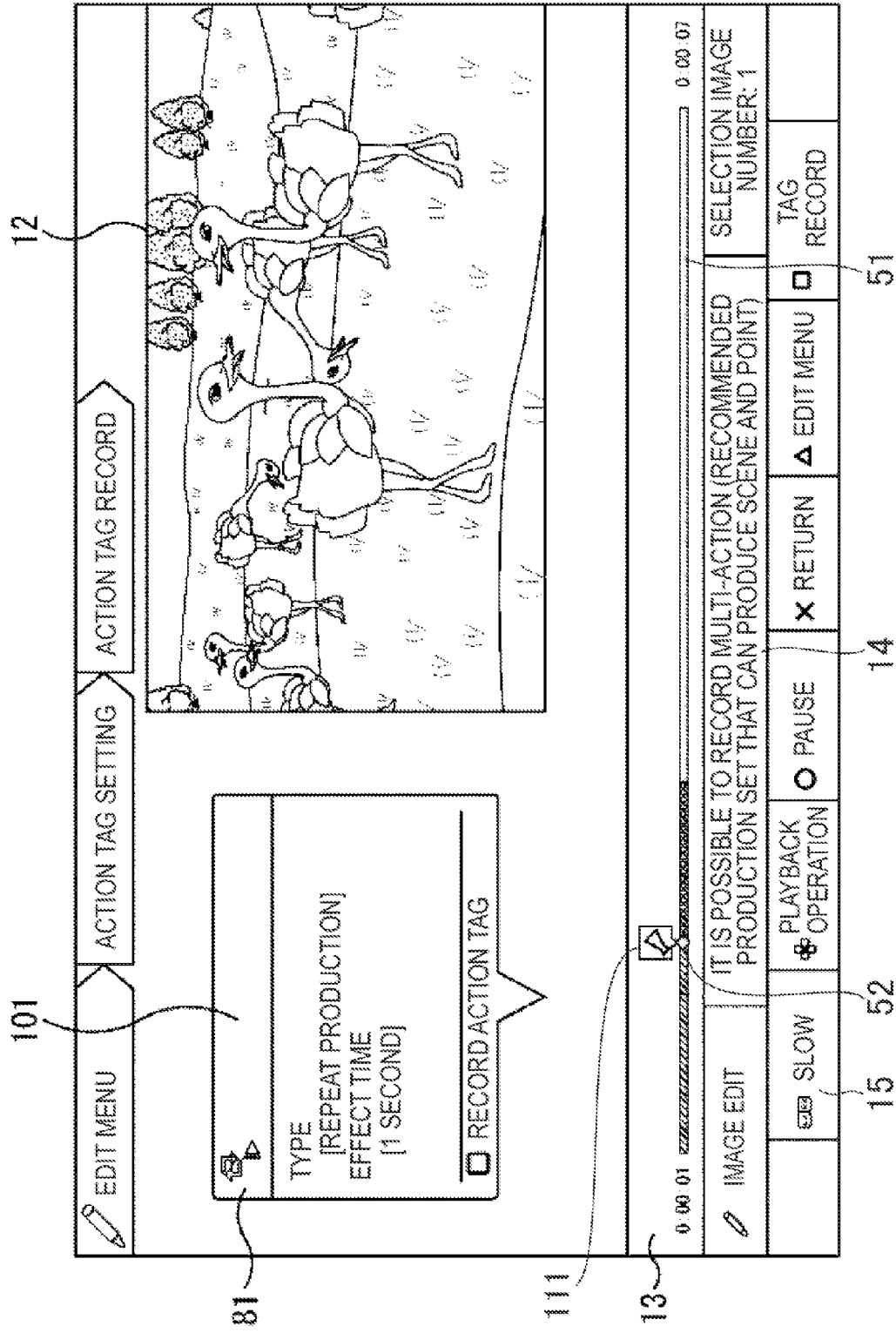
FIG. 7 is a view illustrating an example of an edit screen.

FIG. 7 is a view illustrating an example of an edit screen when the tag record button is pressed once in the state of FIG. 6.

When the tag record button is pressed once, in the position at 1 second from the beginning of the timeline, which corresponds to the playback position at that time, an icon 111 indicating a record position of the multi-action tag is displayed. Also, the information processing apparatus 1 generates information indicating that a multi-action tag, in which the edit effect type is the repeat production and the effect time is 1 second, is set in the position at 1 second from the beginning of the edit target image, and this information is recorded in edit data.

Since 1 second is selected as the effect time, an interval to which the repeat production is applied is an interval in which the position at 1 second from the beginning is the start position and the position at 2 seconds from the beginning is the end position. On the timeline, an icon indicating a record position of the action tag is arranged in the start position of the edit interval.

As the icon 111, the same image as the icon 32 (in FIG. 2) displayed on the edit menu 11 is used. Also, in the overall bar 51 forming the timeline, the edit interval is displayed in a different color from colors of a played interval and non-played interval.

Even after the tag record button is pressed and the multi-action tag is recorded, the playback of the edit target image continues. By pressing the tag record button subsequently, the user can record the multi-action tag in a position after the display position of the icon 111 too.

Thus, by a simple operation of pressing the tag record button during the playback of the edit target image, the user can set the multi-action tag whose content is selected before the start of playback of the edit target image. Since the multi-action tag indicates a combination of two edit effects, the user can produce a scene included in the edit target image easily and more effectively.

[Record of Single Action Tag]

The record of a single action tag such as the caption action tag, the special playback action tag and the sound effect action tag is performed using an interface similar to the interface used to record the multi-action tag.

Figure 8:
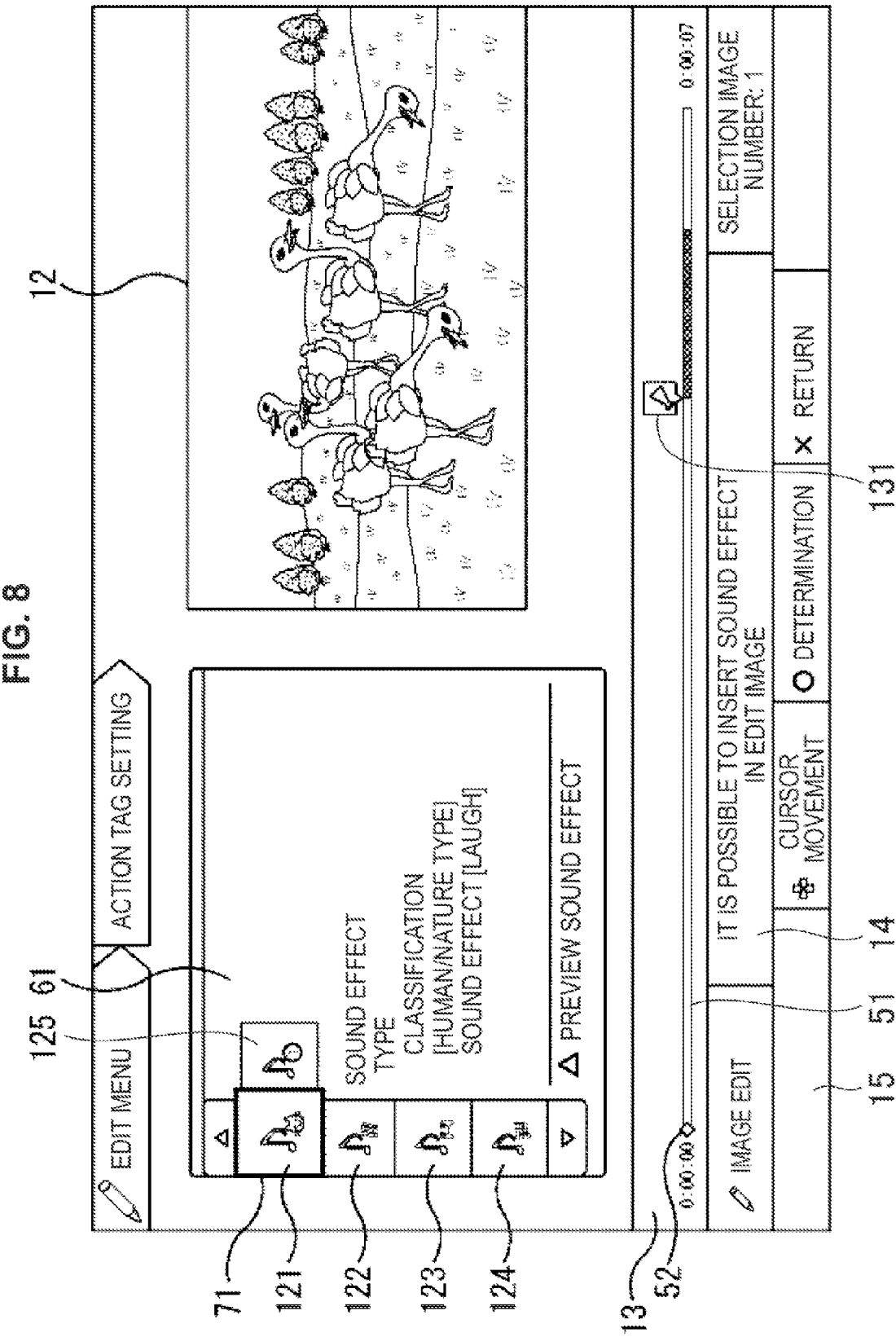
FIG. 8 is a view illustrating an example of an edit screen.

FIG. 8 is a view illustrating an example of an edit screen displayed when a record of a single action tag is selected from the edit menu 11.

Here, although a case will be explained where the sound effect action tag is recorded as a single action tag, a record of other single action tags is performed in the similar operations. When the determination button is pressed in a state where the icon 35 is selected from the edit menu 11 in FIG. 2, the edit screen in FIG. 8 is displayed.

The setting menu 61 is displayed on the position on which the edit menu 11 was previously displayed. The setting menu 61 displays icons 121 to 124 arranged in the vertical direction.

The icon 121 indicates a sound effect of laugh and the icon 122 indicates a sound effect of clapping sound. The icon 123 indicates a sound effect of sound used for games and the icon 124 indicates a sound effect of instrument sound.

In the example of FIG. 8, the sound effect of laugh is selected by the cursor 71 and the icon 121 is displayed in a slightly larger size than other icons. An icon 125 indicating an effect time is displayed on the right side of the icon 121. Similar to the operations explained with reference to FIG. 5, by pressing the up button or the down button, the user can switch the display of the icon 125 and select the effect time.

Below the icon 125, there is displayed an explanation that the currently selected action tag is the laugh-sound-effect action tag classified into a human/nature type.

Thus, by using the setting menu 61, the user can select the edit effect type and the effect time, which are applied to the edit target image, as a single action tag.

When setting the sound effect action tag using the setting menu 61 and pressing the determination button, playback of the edit target image is started. As explained with reference to FIG. 7, by pressing the tag record button during the playback of the edit target image, the user can record the action tag in the playback position at that time.

Also, on the timeline of the timeline area 13, an icon 131 indicating a record position of the multi-action tag is displayed. By repeatedly playing the edit target image, the user can further record a single action tag in the image in which the multi-action tag is already recorded.

Figure 9:
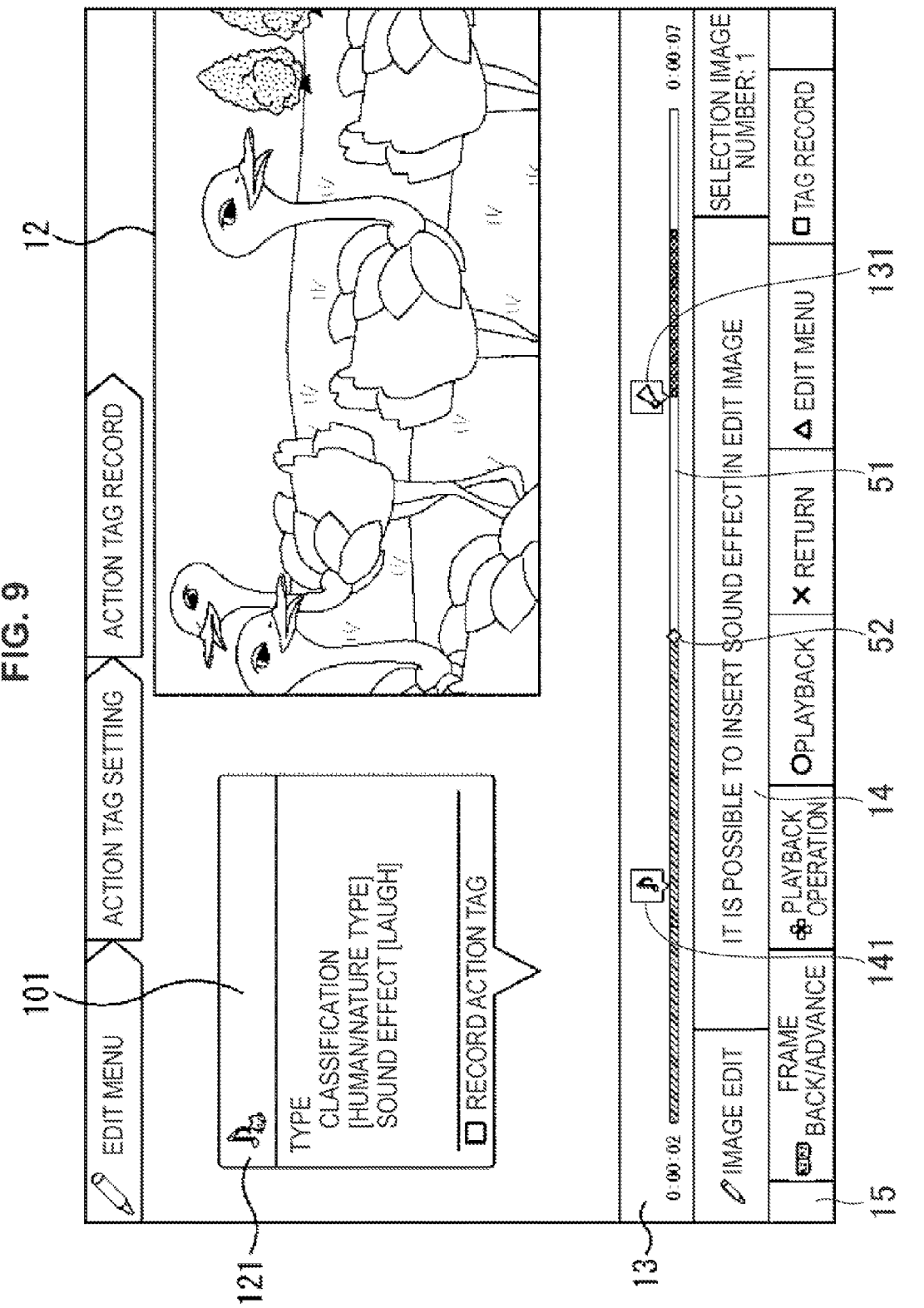
FIG. 9 is a view illustrating an example of an edit screen.

FIG. 9 is a view illustrating an example of an edit screen a predetermined time after the sound effect action tag is instructed to be recorded.

In the example of FIG. 9, the sound effect action tag is recorded in a position before a record position of the multi-action tag in which the icon 131 is arranged, and an icon 141 indicating the record position of the sound effect action tag is displayed on the timeline. As the icon 141, the same image as that of the icon 35 (in FIG. 2) displayed in the edit menu 11 is used. The icon unique to each action tag type is displayed on the timeline, and therefore the user can easily recognize the action tag type recorded in each position.

[Action Tag Edit]

As described above, from the edit menu 11 in FIG. 2, it is possible to select an action tag edit.

Figure 10:
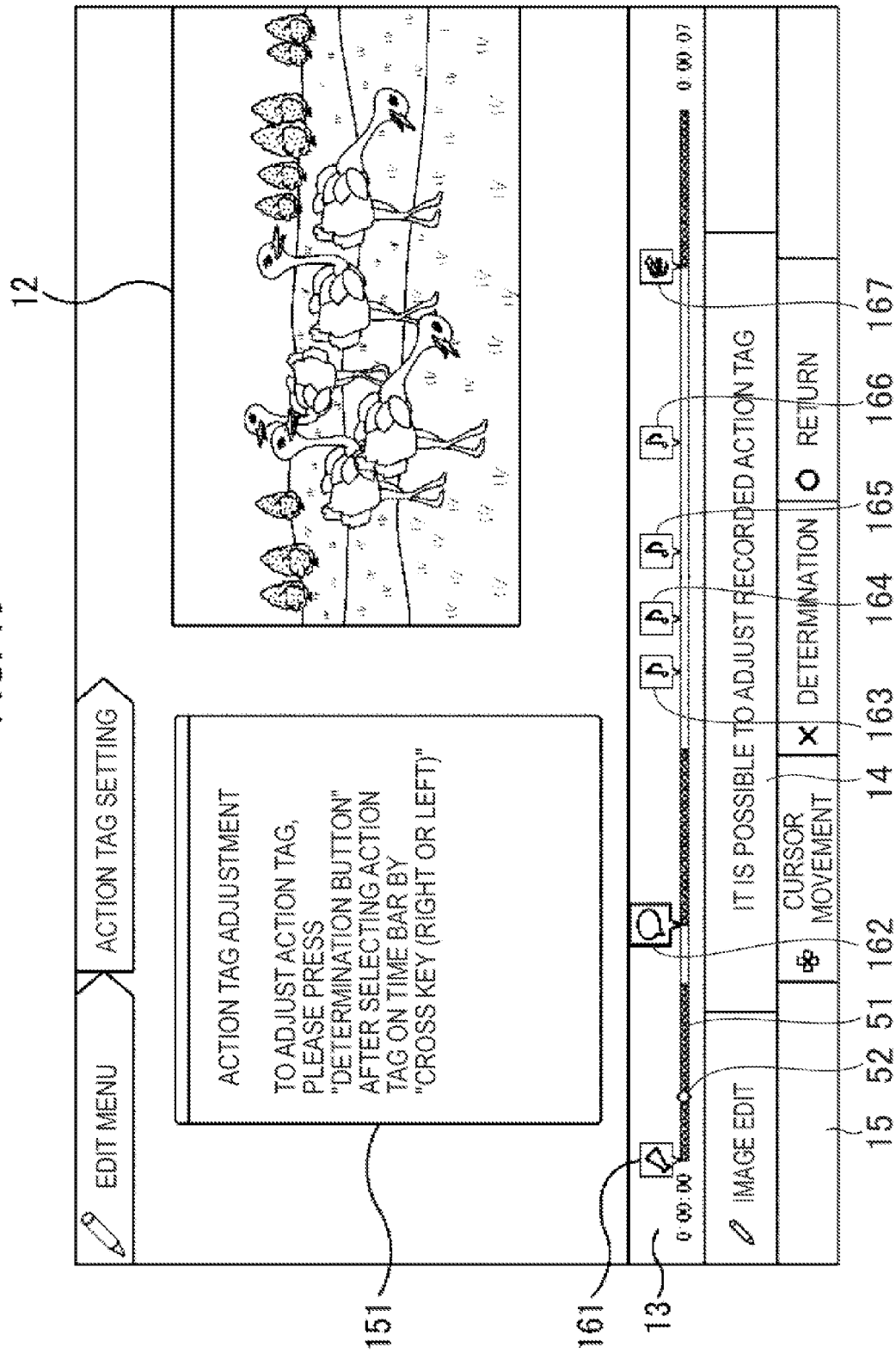
FIG. 10 is a view illustrating an example of an edit screen.

FIG. 10 is a view illustrating an example of an edit screen in a case where the action tag edit is selected by selecting the icon 36 in the edit menu 11 of FIG. 3 and pressing the determination button. In the position on which the edit menu 11 was previously displayed, there is displayed an window 151 including an explanation related to an operation to perform an action tag edit.

On the timeline of the timeline area 13, icons 161 to 167 indicating record positions of action tags are displayed. The icon 161 indicates a record position of the multi-action tag and the icon 162 indicates a record position of the caption action tag. In the example of FIG. 10, there is a state in which the icon 162 is selected and displayed in a slightly larger size than other icons.

The icons 163 to 166 indicate record positions of the sound effect action tag and the icon 167 indicates a record position of the special playback action tag. For example, in the bar 51 forming the timeline, an edit interval in which the record position of the multi-action tag is the start position, an edit interval in which the record position of the caption action tag is the start position, and an edit interval in which the record position of the special playback action tag is the start position, may be displayed in different colors.

By pressing the left button or the right button of the controller 2, the user can switch an icon to be selected. Also, by pressing the determination button to determine the icon selection and further pressing a deletion button, the user can delete an action tag of the selected icon. When an icon is selected and the determination button is pressed, various operations such as action tag deletion and content change are assigned to predetermined buttons of the controller 2.

Also, in a case where a predetermined action tag is selected and action tag content is instructed to be changed, the edit screen display is switched and, for example, the setting menu is displayed instead of the window 151.

The setting menu displays an icon selected when changing the edit effect type set to an action tag and the effect time. By moving the cursor displayed on the setting menu and selecting a predetermined icon, the user can change the edit effect type set to the action tag and change the effect time.

Operations of the information processing apparatus 1 that records an action tag using the above interface will be described later with reference to flowcharts.

Configuration of Information Processing Apparatus

Figure 11:
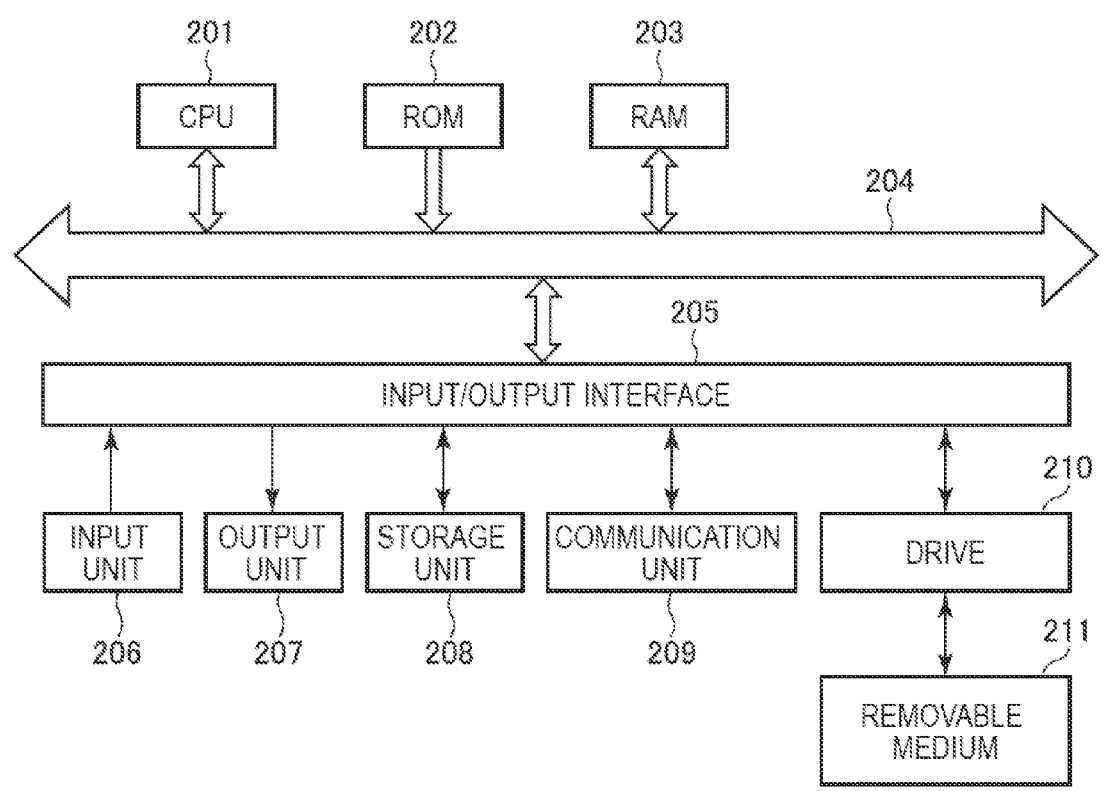
FIG. 11 is a block diagram illustrating a hardware configuration example of an information processing apparatus.

FIG. 11 is a block diagram illustrating a hardware configuration example of the information processing apparatus 1.

A CPU (Central Processing Unit) 201, a ROM (Read Only Memory) 202 and a RAM (Random Access Memory) 203 are connected to each other via a bus 204. Further, an input/output interface 205 is connected to the bus 204. An input unit 206, an output unit 207, a storage unit 208, a communication unit 209 and a drive 210 are connected to the input/output interface 205.

The input unit 206 receives a signal from the controller 2 and outputs it to the CPU 201. The output unit 207 outputs screen data of image edit software to the display apparatus 4 via the cable 3 and performs display control on the display of the display apparatus 4. The storage unit 208 stores an image file imported in the information processing apparatus 1 by a hard disk, flash memory and so on. The image file stored in the storage unit 208 is adequately read by the image edit software.

The communication unit 209 performs transmission/reception of data with an apparatus connected via a network or a mobile terminal connected via wired or wireless communication. The communication unit 209 outputs an image file transmitted from an external device, to the storage unit 208 so as to store it. The drive 210 drives a removable medium 211 such as an optical disk, USB memory attached to the information processing apparatus 1, and reads an image file stored in the removable medium 211. The drive 210 outputs the image file read from the removable medium 211, to the storage unit 208 so as to store it.

Figure 12:
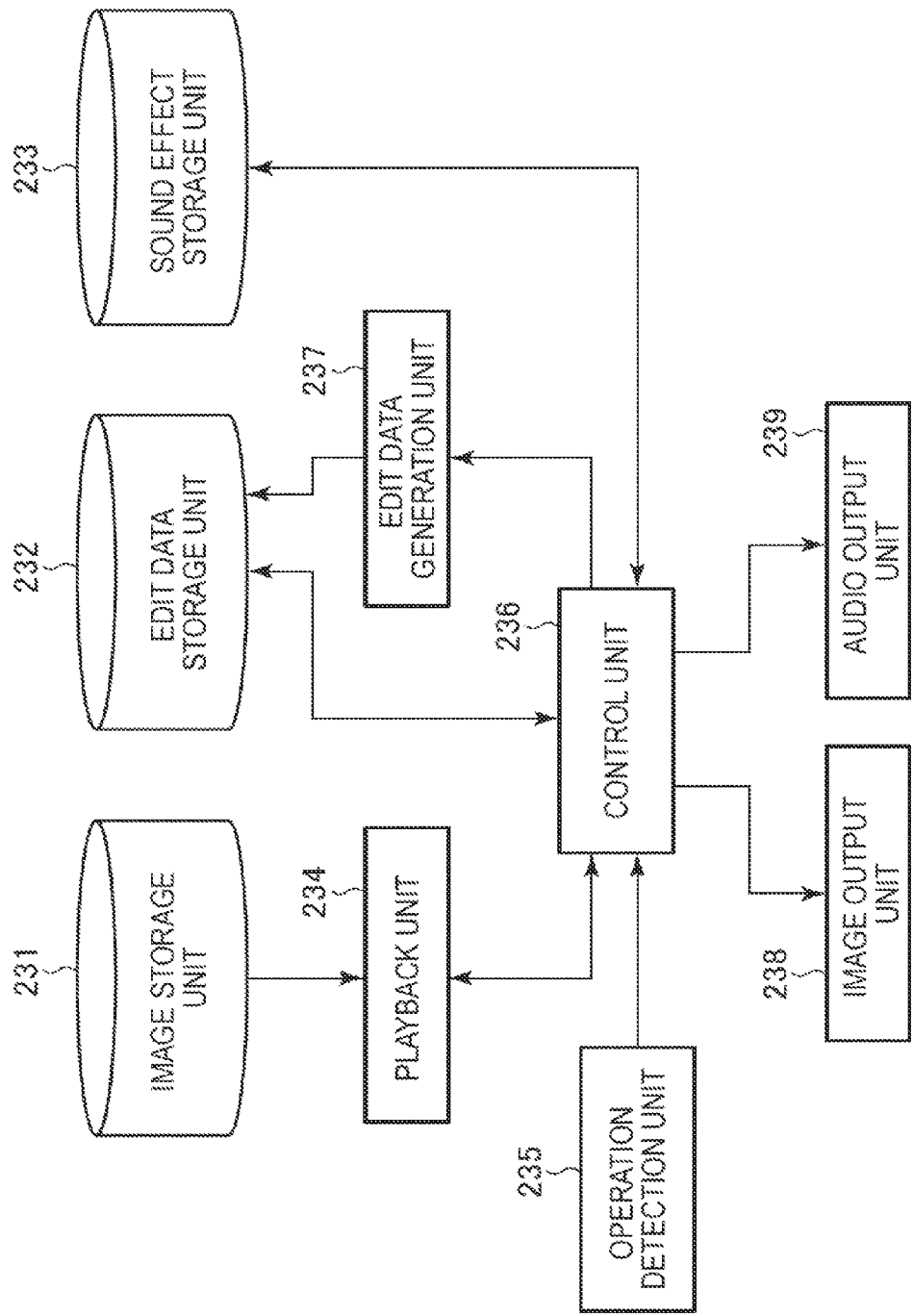
FIG. 12 is a block diagram illustrating a functional configuration example of an information processing apparatus.

FIG. 12 is a block diagram illustrating a functional configuration example of the information processing apparatus 1. At least part of the functional units illustrated in FIG. 12 is realized by executing the image edit software by the CPU 201 in FIG. 11.

The image storage unit 231 stores an image such as motion pictures and slideshow content of still pictures. For the image stored in the image storage unit 231, audio data is adequately attached.

An edit data storage unit 232 stores edit data generated by an edit data generation unit 237. The edit data includes action tag information. The edit data stored in the edit data storage unit 232 is read by a control unit 236 at the time of playback of an edited image. Thus, the edit data is stored in a different storage unit from the one for image data to be edited, and managed.

A sound effect storage unit 233 stores sound effect data. The image storage unit 231, the edit data storage unit 232 and the sound effect storage unit 233 are formed in the storage unit 208 in FIG. 11.

A playback unit 234 reads and decodes the image stored in the image storage unit 231 and outputs image data acquired by the decode to the control unit 236. The image data output to the control unit 236 is data converted into a format in which an image output unit 238 can perform an output to the display apparatus 4. Image playback by the playback unit 234 is performed when playback of an edit target image is instructed in a case where an edit screen is displayed or when playback of an edited image is instructed. In a case where audio data is attached to an image, the playback unit 234 decodes the audio data and outputs audio data acquired by the decode to the control unit 236.

An operation detection unit 235 detects a user operation with respect to the controller 2 based on a signal supplied from the input unit 206 and outputs a signal indicating content of the user operation to the control unit 236.

The control unit 236 controls the overall operation of the information processing apparatus 1, such as the above edit screen display and the generation of edit data based on the user operation with respect to the edit screen.

The edit data generation unit 237 generates edit data every edit target image, according to the control by the control unit 236.

Figure 13:
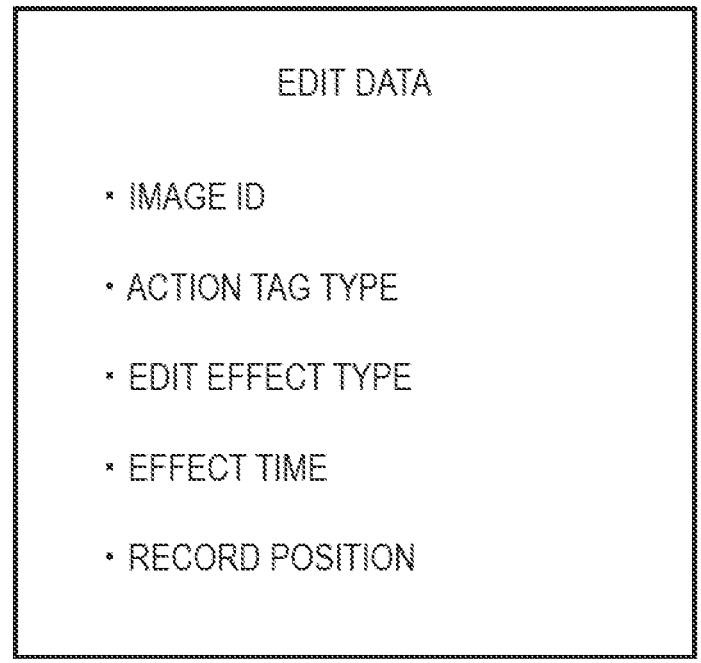
FIG. 13 is a view illustrating an example of an edit screen.

FIG. 13 is a view illustrating an example of information included in edit data.

As illustrated in FIG. 13, edit data records an image ID, action tag type information, edit effect type information, effect time information and record position information. For example, the action tag type information, the edit effect type information, the effect time information and the record position information except for the image ID are recorded in edit data every action tag.

The image ID denotes identification information of an edit target image. The action tag type information denotes information indicating which of the multi-action tag, the caption action tag, the special playback action tag and the sound effect action tag the action tag is. The edit effect type information denotes information indicating an edit effect type selected using the setting menu 61. The effect time information denotes information indicating an edit effect time selected using the setting menu 61. The record position information denotes information indicating a position on the timeline of the edit target image in which the action tag is instructed to be recorded. By the effect time information and the record position information, a position and length of an edit interval are indicated.

The edit data generation unit 237 in FIG. 12 generates edit data including such information, and causes the edit data storage unit 232 to store it.

An image output unit 238 controls and causes the output unit 207 to output the edit screen data or image supplied from the control unit 236, to the display apparatus 4 so as to be displayed.

An audio output unit 239 controls and causes the output unit 207 to output the audio data or sound effect data supplied from the control unit 236, to the display apparatus 4 so as to be output from a speaker set in the display apparatus 4.

Figure 14:
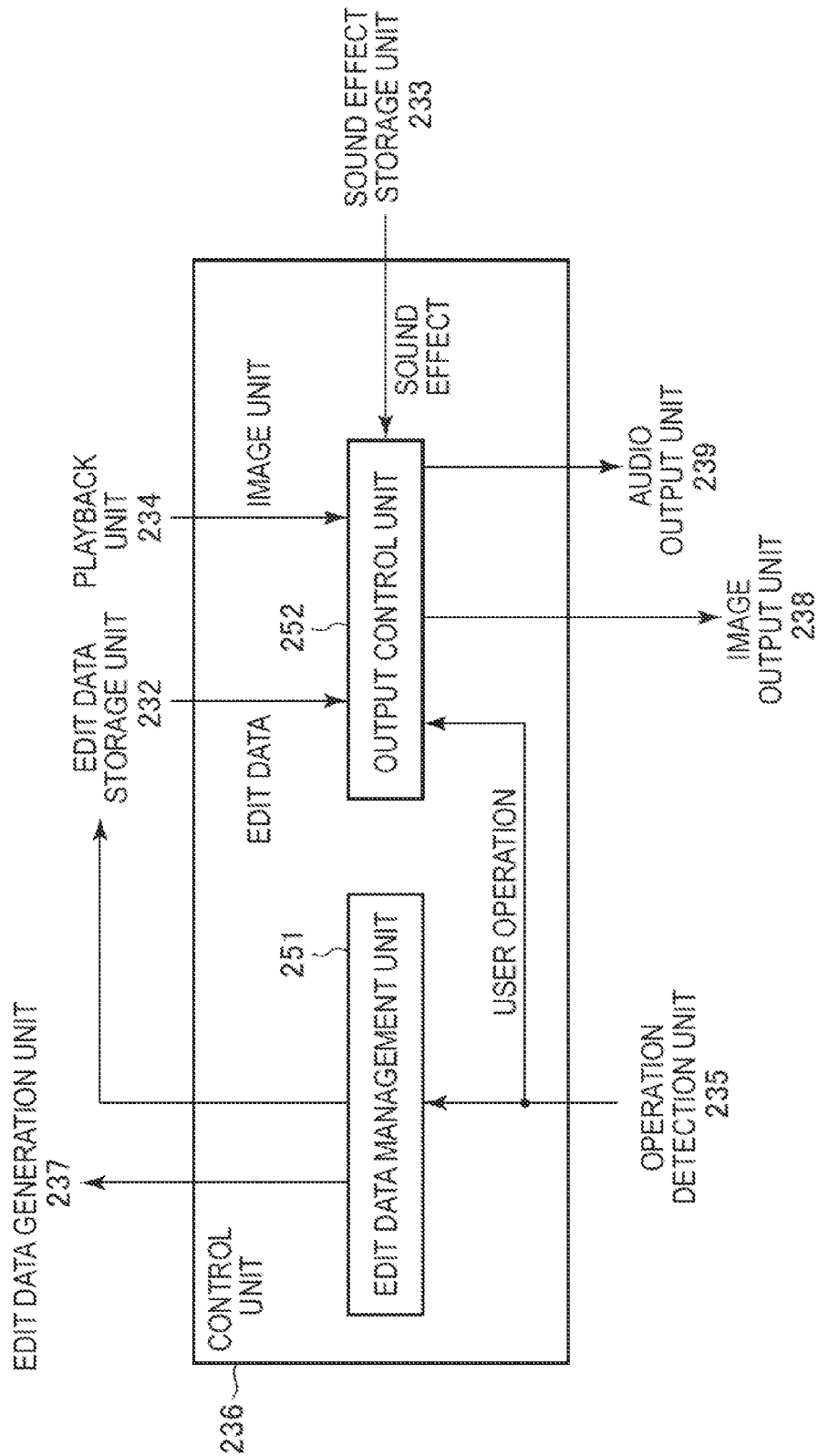
FIG. 14 is a block diagram illustrating a configuration example of the control unit in FIG. 12.

FIG. 14 is a block diagram illustrating a configuration example of the control unit 236 in FIG. 12. The control unit 236 includes an edit data management unit 251 and an output control unit 252.

The edit data management unit 251 outputs information indicating content of a user operation with respect to an edit screen at the time of image edit, to the edit data generation unit 237, so as to generate edit data as described above.

Also, after the edit data is generated, the edit data management unit 251 manages edit data stored in stored in the edit data storage unit 232. For example, in a case where a deletion of a predetermined action tag is instructed as an action tag edit, the edit data management unit 251 deletes information of the action tag instructed to be deleted, from the edit data. Also, in a case where a change of content of a predetermined action tag is instructed, the edit data management unit 251 stores edit data in which the changed content is recorded, in the edit data storage unit 232.

The output control unit 252 outputs edit screen data to the image output unit 238 to cause the display apparatus 4 to display the edit screen.

Also, the output control unit 252 controls playback of an edit target image. For example, in response to a playback instruction by the user at the time of image edit, the output control unit 252 causes the playback unit 234 to play the edit target image, outputs each frame data supplied from the playback unit 234, to the image output unit 238, and displays it on the image display area 12 of the edit screen.

The output control unit 252 causes the playback unit 234 to play an image instructed to be played, at the time of playback of an edited image, and reads edit data including the ID of the image instructed to be played, from the edit data storage unit 232. Also, the output control unit 252 specifies in which position on the timeline of the image an edit effect is set and what content the edit effect has, based on each action tag information recorded in the edit data read from the edit data storage unit 232.

In a case where the current playback position is a position in an edit interval, the output control unit 252 applies an edit effect to the image supplied from the playback unit 234 and outputs the image data to which the edit effect is applied, to the image output unit 238 so as to be displayed by the display apparatus 4.

Also, in a case where an edit effect using a sound effect is set in the current playback position, the output control unit 252 reads the sound effect data from the sound effect storage unit 233 and plays it. The output control unit 252 outputs audio data acquired by playing the sound effect data to the audio output unit 239 so as to be output from the speaker of the display apparatus 4 in response to the display of the image to which the edit effect is applied.

Operations of Information Processing Apparatus

In the following, operations of the information processing apparatus 1 having the above configuration will be explained.

Figure 15:
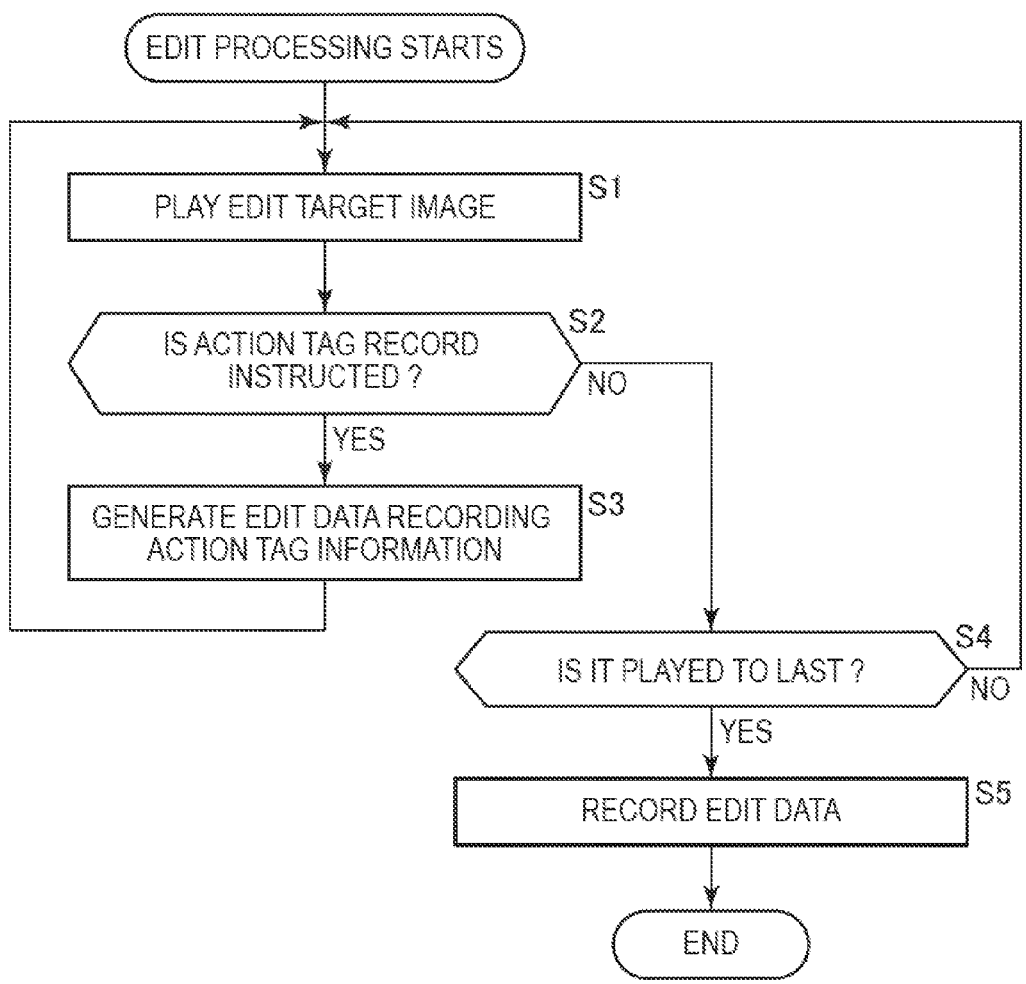
FIG. 15 is a flowchart for explaining edit processing in an information processing apparatus.

First, edit processing in the information processing apparatus 1 will be explained with reference to the flowchart of FIG. 15. The processing in FIG. 15 starts when, for example, selection related to an action tag is performed in the edit screen illustrated in FIG. 4 and an edit target image is instructed to be played.

In step S1, the playback unit 234 plays the edit target image. Image data of the played edit target image is supplied to the output control unit 252 of the control unit 236 and displayed on the image display area 12 of the edit screen.

In step S2, the edit data management unit 251 decides whether an action tag record is instructed.

When it is decided in step S2 that the action tag record is instructed, in step S3, the edit data generation unit 237 generates edit data recording information of the action tag. After that, returning to step S1, playback of the edit target image is maintained.

Meanwhile, when it is decided in step S2 that the action tag record is not instructed, in step S4, the output control unit 252 decides whether the edit target image is played to the last.

When it is decided in step S4 that the edit target image is not played to the last, returning to step S1, the output control unit 252 maintains the playback of the edit target image.

When it is decided in step S4 that the edit target image is played to the last, in step S5, the edit data generation unit 237 causes the edit data storage unit 232 to store edit data recording the action tag information, and finishes the processing.

Next, processing of playing an edited image in the information processing apparatus 1 will be explained with reference to the flowchart of FIG. 16.

Figure 16:
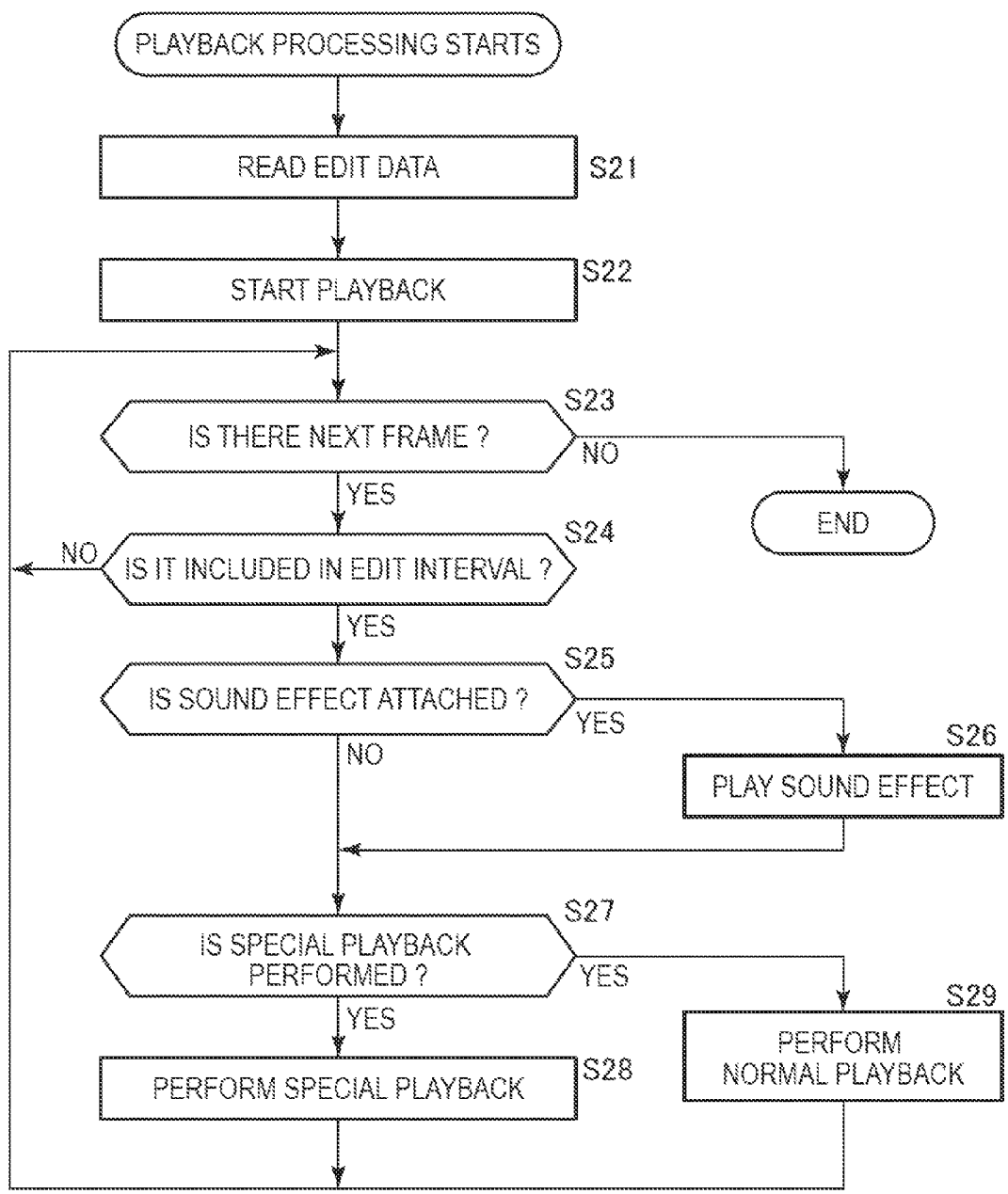
FIG. 16 is a flowchart for explaining playback processing in an information processing apparatus.

The processing in FIG. 16 starts when playback of the edited image is instructed. For example, the playback of the edited image is performed when an action tag is further recorded in the edit screen or after a predetermined image is selected from a list of edited images.

In step S21, the output control unit 252 of the control unit 236 reads edit data including the ID of the image instructed to be played, from the edit data storage unit 232.

In step S22, the playback unit 234 starts playback of an edited image. Each frame image data acquired by performing the playback is supplied to the output control unit 252.

In step S23, the output control unit 252 decides whether there is the next frame.

When it is decided in step S23 that there is the next frame, in step S24, the output control unit 252 decides whether the next frame is included in an edit interval, based on the edit data read from the edit data storage unit 232. The decision herein is performed by specifying the edit interval based on the effect time information and record position information of each action tag included in the edit data and deciding whether the next frame is included in the specified edit interval.

When it is decided in step S24 that the next frame is included in the edit interval, in step S25, the output control unit 252 decides whether to attach a sound effect to the next frame. For example, in a case where the edit data records a multi-action tag using a sound effect or information of a sound effect action tag, the timing of attaching the sound effect is specified by the effect time information and record position information included in the edit data. Also, by edit effect type information included in the edit data, the sound effect type such as laugh and clapping is specified.

When it is decided in step S25 that a sound effect is attached to the next frame, in step S26, the output control unit 252 reads sound effect data from the sound effect storage unit 233 and plays it. The sound effect data acquired by performing the playback is output to the audio output unit 239 so as to be output from the speaker of the display apparatus 4 in response to an output of the next frame. When it is decided in step S25 that a sound effect is not attached to the next frame, the processing in step S26 is skipped.

In step S27, the output control unit 252 decides whether to perform special playback with respect to the next frame. For example, in a case where the edit data records information of a multi-action tag using a special playback edit effect such as slow playback, the timing of applying the special playback edit effect is specified by the effect time information and record position information included in the edit data. Also, by edit effect type information included in the edit data, the edit effect type of special playback to be combined and applied is specified.

When it is decided in step S27 that special playback is performed with respect to the next frame, in step S28, the output control unit 252 applies a special playback edit effect to image data of the next frame played by the playback unit 234. The image data to which the special playback edit effect is applied is supplied to the display apparatus 4 via the image output unit 238 and used to display an image.

Meanwhile, when it is decided in step S27 that special playback is not performed with respect to the next frame, in step S29, the output control unit 252 performs normal playback of the next frame. An image played by the playback unit 234 is supplied as is to the display apparatus 4 via the image output unit 238 and used to display an image.

After the special playback is performed in step S28, after the normal playback is performed in step S29 or when it is decided in step S24 that the next frame is not included in the edit interval, returning to step S23, the above processing is repeatedly performed.

When the playback is completed to the last frame and it is decided in step S23 that there is no next frame, the processing is finished.

By the above processing, the user can easily apply a more effective production to an image using a multi-action tag designating a combination of multiple edit effects. Also, even if the edit target image type is motion pictures or slideshow contents of still pictures, the user can perform an edit using the same interface.

Variation Example

Although a case has been described where the number of edit effects that can be combined and applied using a multi-action tag is two, it may be possible to designate a combination of three or more edit effects by the multi-action tag.

Also, although a case has been described where it is possible to designate a combination of edit effects applied to an image by a multi-action tag, it may be possible to designate a combination of edit effects applied to audio data by a multi-action tag.

The above series of processing can be performed by hardware or software. When the series of processing is performed by software, a program forming the software is installed in a computer incorporated in dedicated hardware or a general-purpose personal computer.

The installed program is recorded in the removable medium 211 illustrated in FIG. 11, which includes an optical disk (CD-ROM (Compact Disc-Read Only Memory)), DVD (Digital Versatile Disc) or a semiconductor memory, and provided. Also, it may be provided via wired or wireless transmission medium such as a local area network, the Internet and digital broadcast. The program can be installed in advance in the ROM 202 and the storage unit 208.

Also, programs executed by a computer may be programs to sequentially perform processing along the order explained in the present specification, or programs to perform the processing in parallel or at a requested timing such as the timing a call is made.

It should be understood by those skilled in the art that various modifications, combinations, sub-combinations and alterations may occur depending on design requirements and other factors insofar as they are within the scope of the appended claims or the equivalents thereof.

For example, the present disclosure can employ a cloud computing configuration to process one function by multiple apparatuses via a network in a shared or cooperative manner.

Also, each step explained in the above flowcharts can be performed by one apparatus or performed by a plurality of apparatuses in a shared manner.

Further, in a case where multiple items of processing are included in one step, the multiple items of processing included in the one step can be performed by one apparatus or performed by a plurality of apparatuses in a shared manner.

[Configuration Combination Example]

Additionally, the present technology may also be configured as below.

(1) An information processing apparatus including:
a control unit controlling playback of an image of an edit target; and
a generation unit generating edit information including information indicating multiple edit effects applied in combination with the image of an edit interval and information indicating the edit interval, where, in a playback interval of the image, the edit interval is an interval from a playback position at a time an instruction is given during the playback of the image to a position a predetermined time after the playback position.

(2) The information processing apparatus according to (1), wherein the control unit combines and applies the multiple edit effects to the image of the edit interval based on the edit information in a case of playing the image for which the edit information is generated.

(3) The information processing apparatus according to (1) or (2), further including a display control unit displaying a selection screen for the predetermined time and a type of the edit effect before a start of playback of the image.

(4) The information processing apparatus according to (3), wherein, in a case where one of the edit effects is selected as the edit effect applied to the image of the edit interval, the generation unit generates the edit information including information indicating the one edit effect and information indicating the edit interval.

(5) The information processing apparatus according to (3) or (4), wherein the display control unit causes a timeline to be displayed in which an icon indicating an interval to which the edit effect is applied is arranged in a start position of the edit interval.

(6) The information processing apparatus according to (5), wherein the display control unit caused different icons to be displayed as an icon indicating an interval to which the multiple edit effects are applied and an icon indicating an interval to which the one edit effect is applied.

(7) The information processing apparatus according to (5) or (6), wherein the display control unit causes to be displayed in different colors an interval of the timeline corresponding to the edit interval to which the multiple edit effects are applied, and an interval of the timeline corresponding to the edit interval to which the one edit effect is applied.

(8) The information processing apparatus according to any one of (1) to (7), further including a management unit recording and managing the edit information separately from the image.

(9) The information processing apparatus according to (8), wherein the management unit deletes information of the edit effect selected by a user, from the edit information.

(10) The information processing apparatus according to (8) or (9), wherein the management unit changes content of the edit effect selected by a user and records information of the edit effect representing the changed content, in the edit information.

(11) An information processing method including:
playing an image of an edit target; and
generating edit information including information indicating multiple edit effects applied in combination with the image of an edit interval and information indicating the edit interval, where, in a playback interval of the image, the edit interval is an interval from a playback position at a time an instruction is given during the playback of the image to a position a predetermined time after the playback position.

(12) A program causing a computer to execute:
playing an image of an edit target; and
generating edit information including information indicating multiple edit effects applied in combination with the image of an edit interval and information indicating the edit interval, where, in a playback interval of the image, the edit interval is an interval from a playback position at a time an instruction is given during the playback of the image to a position a predetermined time after the playback position.

What is claimed is:

1. An information processing apparatus comprising:
a control unit controlling playback of an image of an edit target; and
a generation unit generating edit information including information indicating multiple edit effects applied in combination with the image of an edit interval and information indicating the edit interval, where, in a playback interval of the image, the edit interval is an interval from a playback position at a time an instruction is given during the playback of the image to a position a predetermined time after the playback position,
wherein the instruction is specified by a user.

2. The information processing apparatus according to claim 1, wherein the control unit combines and applies the multiple edit effects to the image of the edit interval based on the edit information in a case of playing the image for which the edit information is generated.

3. The information processing apparatus according to claim 1, further comprising a display control unit displaying a selection screen for the predetermined time and a type of the edit effect before a start of playback of the image.

4. The information processing apparatus according to claim 3, wherein, in a case where one of the edit effects is selected as the edit effect applied to the image of the edit interval, the generation unit generates the edit information including information indicating the one edit effect and information indicating the edit interval.

5. The information processing apparatus according to claim 4, wherein the display control unit causes a timeline to be displayed in which an icon indicating an interval to which the edit effect is applied is arranged in a start position of the edit interval.

6. An information processing apparatus comprising:
a control unit controlling playback of an image of an edit target;
a generation unit generating edit information including information indicating multiple edit effects applied in combination with the image of an edit interval and information indicating the edit interval, where, in a playback interval of the image, the edit interval is an interval from a playback position at a time an instruction is given during the playback of the image to a position a predetermined time after the playback position; and
a display control unit displaying a selection screen for the predetermined time and a type of the edit effect before a start of playback of the image,
wherein, in a case where one of the edit effects is selected as the edit effect applied to the image of the edit interval, the generation unit generates the edit information including information indicating the one edit effect and information indicating the edit interval,
wherein the display control unit causes a timeline to be displayed in which an icon indicating an interval to which the edit effect is applied is arranged in a start position of the edit interval, and
wherein the display control unit causes different icons to be displayed as an icon indicating an interval to which the multiple edit effects are applied and an icon indicating an interval to which the one edit effect is applied.

7. An information processing apparatus comprising:
a control unit controlling playback of an image of an edit target;
a generation unit generating edit information including information indicating multiple edit effects applied in combination with the image of an edit interval and information indicating the edit interval, where, in a playback interval of the image, the edit interval is an interval from a playback position at a time an instruction is given during the playback of the image to a position a predetermined time after the playback position; and
a display control unit displaying a selection screen for the predetermined time and a type of the edit effect before a start of playback of the image,
wherein, in a case where one of the edit effects is selected as the edit effect applied to the image of the edit interval, the generation unit generates the edit information including information indicating the one edit effect and information indicating the edit interval,
wherein the display control unit causes a timeline to be displayed in which an icon indicating an interval to which the edit effect is applied is arranged in a start position of the edit interval, and
wherein the display control unit causes to be displayed in different colors, an interval of the timeline corresponding to the edit interval to which the multiple edit effects are applied, and an interval of the timeline corresponding to the edit interval to which the one edit effect is applied.

8. The information processing apparatus according to claim 1, further comprising a management unit causing to be recorded and managing the edit information separately from the image.

9. An information processing apparatus comprising:
a control unit controlling playback of an image of an edit target;
a generation unit generating edit information including information indicating multiple edit effects applied in combination with the image of an edit interval and information indicating the edit interval, where, in a playback interval of the image, the edit interval is an interval from a playback position at a time an instruction is given during the playback of the image to a position a predetermined time after the playback position; and
a management unit causing to be recorded and managing the edit information separately from the image,
wherein the management unit deletes information of the edit effect selected by a user, from the edit information.

10. An information processing apparatus comprising:
a control unit controlling playback of an image of an edit target;
a generation unit generating edit information including information indicating multiple edit effects applied in combination with the image of an edit interval and information indicating the edit interval, where, in a playback interval of the image, the edit interval is an interval from a playback position at a time an instruction is given during the playback of the image to a position a predetermined time after the playback position; and
a management unit causing to be recorded and managing the edit information separately from the image, wherein the management unit changes content of the edit effect selected by a user and records information of the edit effect representing the changed content, in the edit information.

11. A method for use with an information processing apparatus, said method comprising:
   playing an image of an edit target;
   enabling a user of the information processing apparatus to specify an instruction; and
   generating edit information including information indicating multiple edit effects applied in combination with the image of an edit interval and information indicating the edit interval, where, in a playback interval of the image, the edit interval is an interval from a playback position at a time the instruction is given during the playback of the image to a position a predetermined time after the playback position.

12. A non-transitory computer readable medium having stored thereon a program causing a computer to execute processes including:
   playing an image of an edit target;
   enabling a user to specify an instruction; and
   generating edit information including information indicating multiple edit effects applied in combination with the image of an edit interval and information indicating the edit interval, where, in a playback interval of the image, the edit interval is an interval from a playback position at a time the instruction is given during the playback of the image to a position a predetermined time after the playback position.

\* \* \* \* \*